United States Patent
Yoon

(10) Patent No.: US 7,344,254 B2
(45) Date of Patent: Mar. 18, 2008

(54) PROJECTION SYSTEM WITH A COMMON LIGHT SOURCE SHARING SYSTEM

(75) Inventor: Youngshik Yoon, Indianapolis, IN (US)

(73) Assignee: Thomson Licensing, Boulogne Billancourt (FR)

(*) Notice: Subject to any disclaimer, the term of this patent is extended or adjusted under 35 U.S.C. 154(b) by 140 days.

(21) Appl. No.: 10/811,171

(22) Filed: Mar. 26, 2004

(65) Prior Publication Data

US 2004/0263794 A1 Dec. 30, 2004

Related U.S. Application Data

(60) Provisional application No. 60/458,642, filed on Mar. 28, 2003.

(51) Int. Cl.
*G03B 21/28* (2006.01)
*F21V 7/04* (2006.01)
*G02B 6/34* (2006.01)
*G02B 5/30* (2006.01)
*G02B 27/14* (2006.01)
*G02B 27/12* (2006.01)
*G02F 1/1335* (2006.01)

(52) U.S. Cl. ............... 353/81; 353/20; 353/33; 353/82; 362/551; 385/36; 385/133; 349/9; 359/638; 359/640

(58) Field of Classification Search ......... 353/81, 353/82, 102, 20, 33; 362/551; 385/28, 34, 385/36, 49, 115, 133; 349/5, 7–9, 96; 359/483, 359/487, 496, 497, 618, 621, 623, 629, 638, 359/640; 348/744

See application file for complete search history.

(56) References Cited

U.S. PATENT DOCUMENTS

| 4,125,864 A * | 11/1978 | Aughton ............... 347/240 |
|---|---|---|
| 6,843,591 B1 * | 1/2005 | Peng et al. ............. 362/560 |
| 2001/0033418 A1 * | 10/2001 | Hayashi ................ 359/487 |
| 2002/0001051 A1 | 1/2002 | Krusius et al. ............ 349/73 |
| 2002/0080485 A1 * | 6/2002 | Suzuki et al. ............ 359/487 |
| 2002/0176255 A1 * | 11/2002 | Yamauchi et al. ......... 362/299 |
| 2002/0191235 A1 | 12/2002 | O'Connor et al. ........... 359/9 |
| 2003/0025842 A1 | 2/2003 | Saccomanno ............. 348/758 |

* cited by examiner

*Primary Examiner*—Rochelle Blackman
(74) *Attorney, Agent, or Firm*—Joseph J. Laks; Harvey Fried; Patricia Verlangieri

(57) ABSTRACT

A projection display with a common light source sharing system for improved illumination uniformity is described. The common light source is coupled through a light-dividing prism to multiple integrators. Each integrator is coupled to one or more imaging devices that project image tiles to form a larger composite tiled image.

6 Claims, 3 Drawing Sheets

1

PROJECTION SYSTEM WITH A COMMON LIGHT SOURCE SHARING SYSTEM

CROSS-REFERENCE TO RELATED APPLICATIONS

This application claims the benefit of U.S. Provisional Patent Application Ser. No. 60/458,642, entitled "COMMON LIGHT SOURCE SHARING SYSTEM" and filed Mar. 28, 2003, which is herein incorporated by reference in its entirety.

FIELD OF THE INVENTION

The present invention is directed to projection display devices and, more particularly to light engines for projection display devices.

BACKGROUND OF THE INVENTION

There is a high demand among consumers for high-definition large screen displays such as, for example, liquid crystal displays (LCDs), digital light pulse (DLP) displays and Liquid Crystal on Silicon (LCOS) displays. Typical liquid crystal displays (LCDs) for consumer applications have SVGA resolution of approximately 600×800 pixels, although high-end projection displays have been introduced with up to 1920×1080 pixels. Displaying such low resolution on a large display yields unacceptable picture quality, for example, an SVGA display projected as a 10-foot diagonal image has a minimum pixel size of approximately ⅛-inch by ⅛-inch. Furthermore, high-definition television (HDTV) has a width to height aspect ratio of 16:9 as opposed to computer monitors and standard television, which have a width to height ratio of 4:3.

There have been several attempts to make a large size projection display, based on combining several smaller projected image "tiles" into a larger composite tiled image. For such systems, multiple projection lamps have been used, one for each "tile" displayed in the composite tiled image. Such multi-lamp projection systems have generally proved less than satisfactory, because of a lack of illumination uniformity between the tiles. This lack of illumination uniformity is typically caused because each lamp exhibits differing brightness and color characteristics as compared to the other lamps in the system. Even if matching light sources such as, for example, metal halide lamps, are chosen, the brightness and color characteristics will change as the individual lamps age.

Thus, a need exists in the art for a projection display with uniform illumination between projected image tiles in a composite tiled image.

SUMMARY OF THE INVENTION

The present invention provides a projection display with a common light source sharing system for improved illumination uniformity. A common light source is coupled through a light-dividing prism to multiple integrators. Each integrator is coupled to one or more imaging devices that project image tiles to form a larger composite tiled image.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
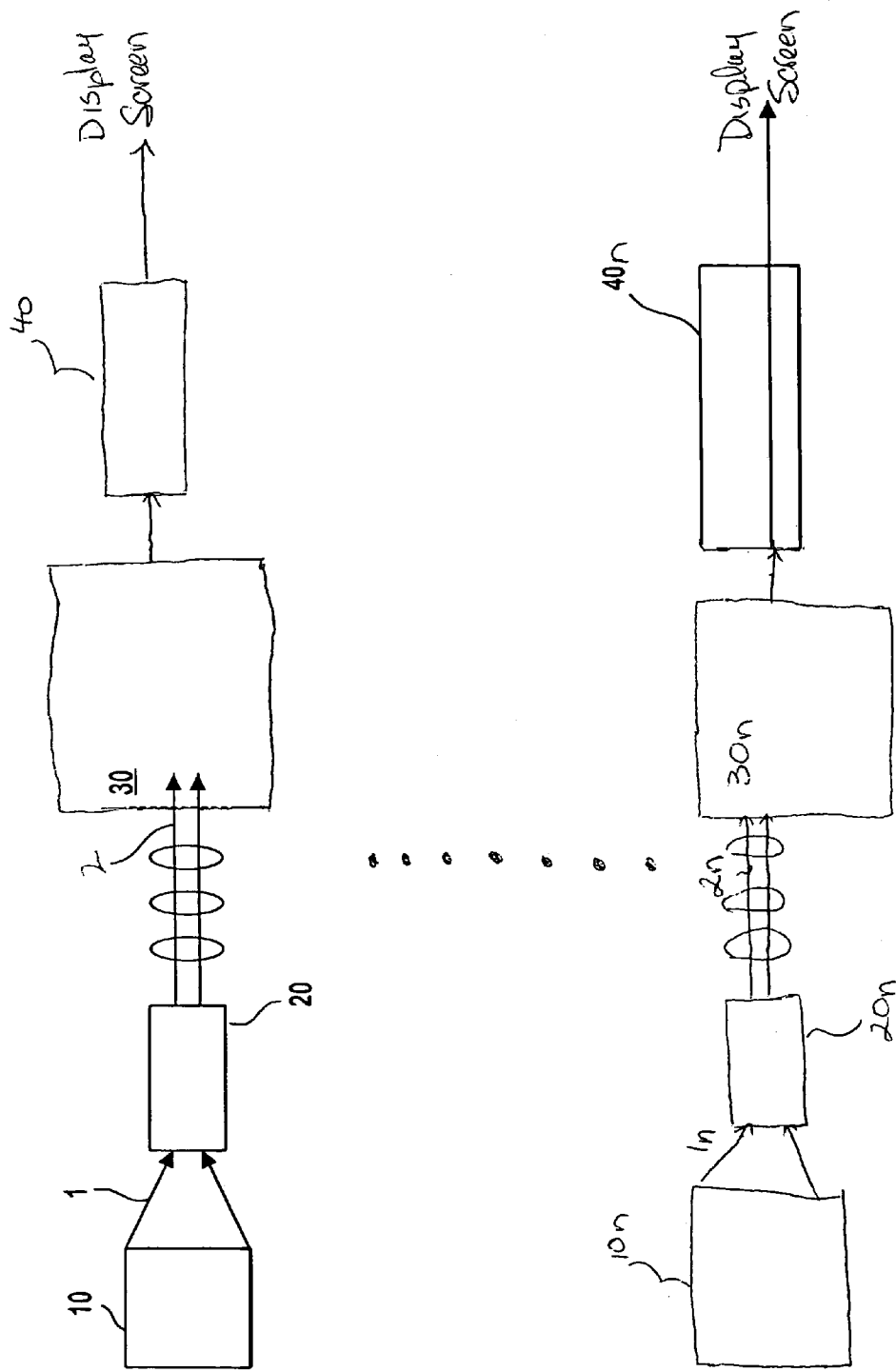
FIG. 1 shows a prior art projection display apparatus.

FIG. 1 shows an example of a prior art projection display apparatus that can be used for projecting each tile of a tiled display. White light 1 is generated by a lamp 10. Lamp 10 may be any lamp suitable for use in a microdisplay system. For example a short-arc mercury lamp may be used. The white light 1 enters an integrator 20, which directs a telecentric beam of white light 1 toward the projection system 30. The white light 1 is then separated into its component red, green, and blue (RGB) bands of light 2. The RGB light 2 may be separated by dichroic mirrors (not shown) and directed into separate red, green, and blue imagers within projection system 30 for modulation. The modulated RGB light 2 is then recombined by a prism assembly (not shown) and projected by a projection lens assembly 40 onto a display screen (not shown). Alternatively, the white light 1 may be separated into RGB bands of light 2 in the time domain, for example, by a color wheel (not shown), and thus directed one-at-a-time into projection system 30.

Figure 2:
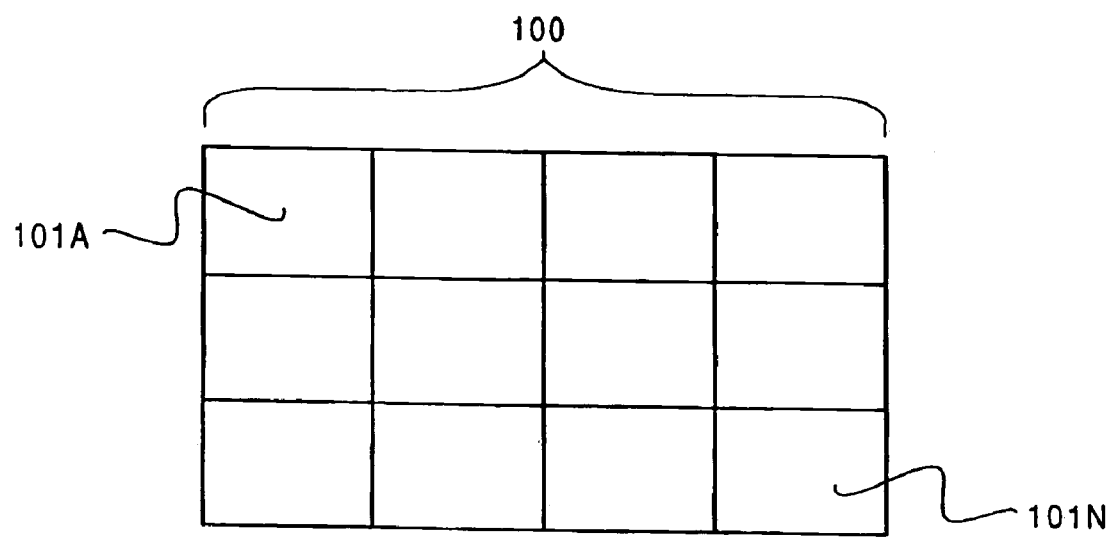
FIG. 2 shows a projection display image that is broken down into twelve individual display tiles.

Referring to FIG. 2, a tiled projected image 100 is composed of individual display tiles 101A . . . 101N. The tiled projected image 100 shown in FIG. 2 has a three-row by four-column array of tiles, however, other embodiments can have different tile array configurations including non-rectangular display tiles (not shown), such as hexagons and diamond-shaped tiles, and tile configurations where the composite projected display is non-rectangular, such as a triangle. Each display tile 101A . . . 101N displays a portion of a complete image as projected from an associated display projector.

Figure 3:
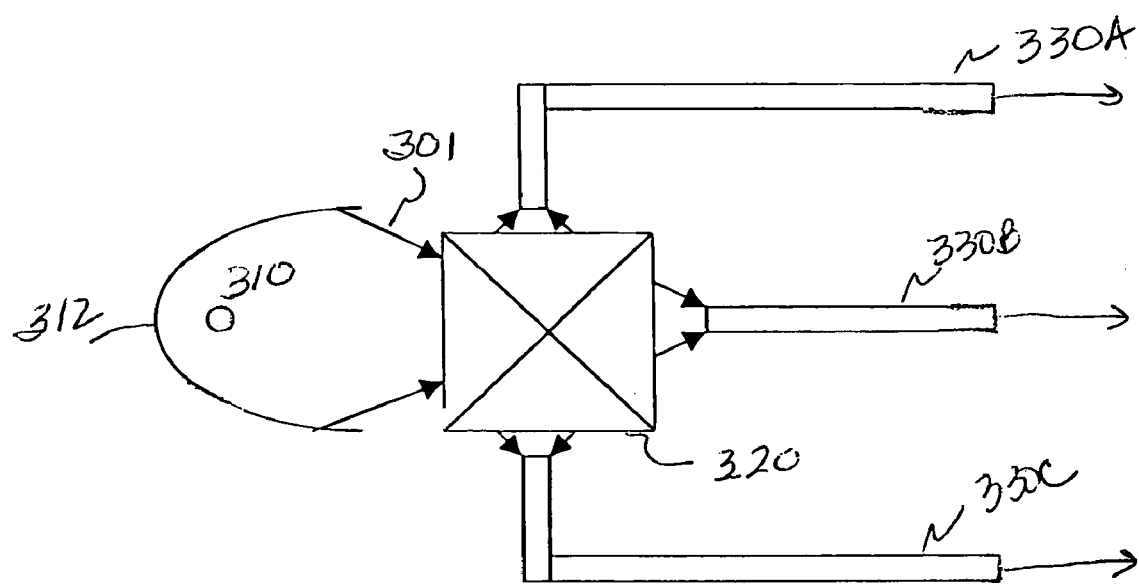
FIG. 3 depicts one embodiment of the present invention in which a common light source is coupled through a light-dividing prism to multiple integrators.
Figure 4:
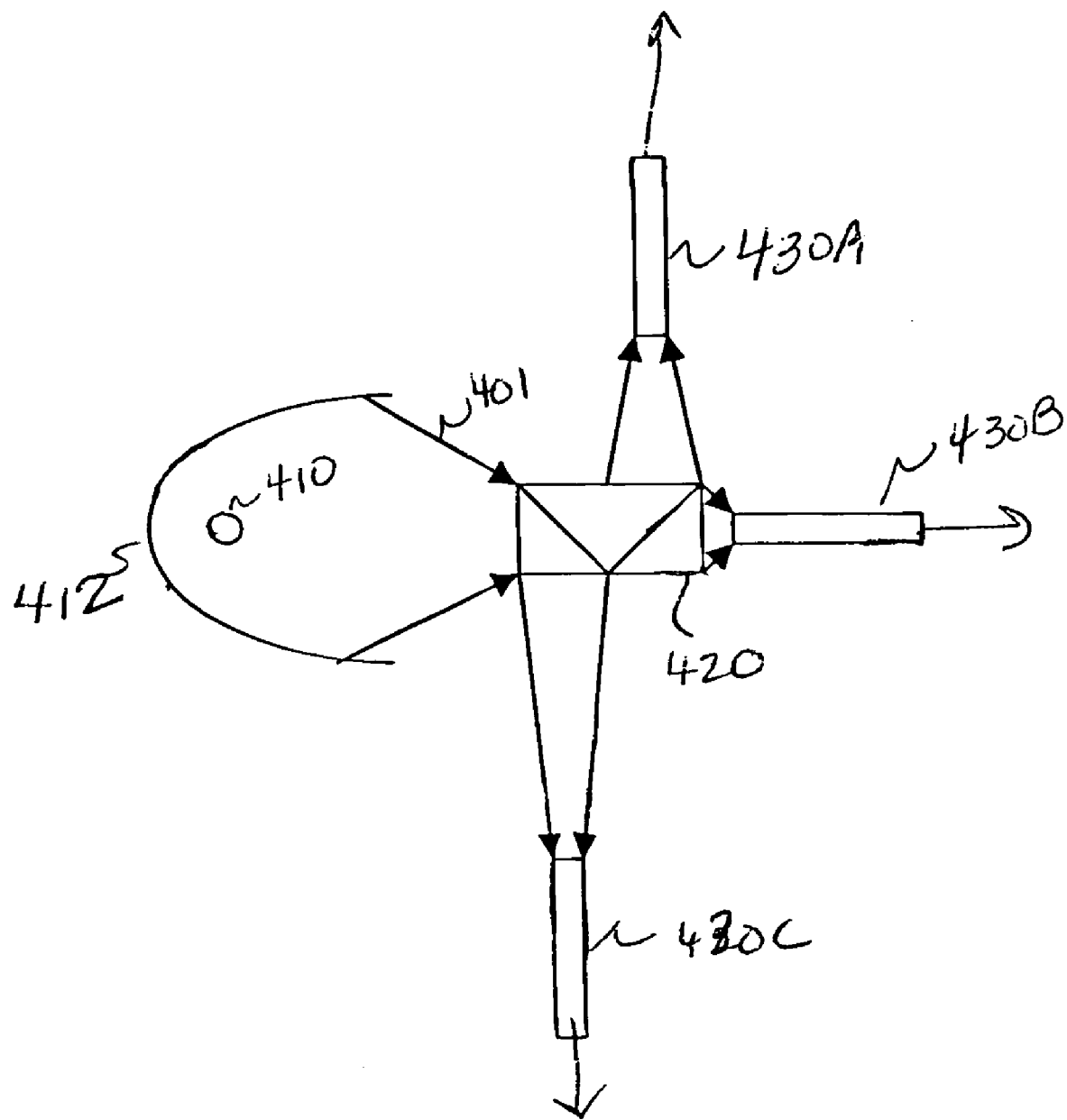
FIG. 4 depicts another embodiment of the present invention in which a common light source is coupled through a light-dividing prism to multiple integrators.

FIG. 3 depicts one embodiment of the present invention in which light 301 from a common light source 310 is coupled through a light-dividing prism 320 into multiple integrators 330A, 330B, 330C. The light 301 may be reflected from an elliptical reflector 312 into the light-dividing prism 320. The integrators 330A, 330B 330C may be fiber integrator, which advantageously provide mechanical flexibility, so that the light source 310 may have a flexible location and may be located anywhere. Instead of using multiple light sources, the single shared light source simplifies the projection display with uniform illumination provided to each integrator 330A, 330B, 330C. The light-dividing prism 320 shown in FIG. 3 has a square shape, other light-dividing prisms may have other shapes as shown in FIG. 4. For LCD or LCOS displays the light-dividing prism 320 may divide the light provided from the light source 301 using polarization control. Dividing the light from the light source 301 based on polarization control may improve the light efficiency and thus the cost.

The embodiment shown in FIG. 3 provides a projection system in which all the segment projection illuminations will have the same characteristics and individual projector illumination differences will no longer be a problem.

Each integrator 330A, 330B, 330C directs a telecentric beam of light toward a projection system (not shown). The white light is then separated into its component red, green, and blue (RGB) bands of light (not shown). The RGB light may be separated by dichroic mirrors (not shown) and directed into separate red, green, and blue imagers within projection system for modulation. The modulated RGB light is then recombined by a prism assembly (not shown) and projected by a projection lens assembly (not shown) onto a display screen (not shown). Alternatively, the light from each integrator 330A, 330B, 330C may be separated into RGB bands of light in the time domain, for example, by a color wheel (not shown), and thus directed one-at-a-time into the projection system (not shown).

FIG. 4 depicts another embodiment of the present invention in which light 401 from a common light source 410 is coupled through a rectangular shaped light-dividing prism 420 into multiple integrators 430A, 430B, 430C. The light 401 may be reflected from an elliptical reflector 412 into the light-dividing prism 420. For LCD or LCOS displays the light-dividing prism 420 may divide the light provided from the light source 401 using polarization control. Dividing the light from the light source 401 based on polarization control may improve the light efficiency and thus the cost.

The integrators 430A, 430B 430C may be fiber integrator, which advantageously provide mechanical flexibility, so that the light source 410 may have a flexible location and may be located anywhere. The embodiment shown in FIG. 4 also provides a projection system in which all the segment projection illuminations will have the same characteristics and individual projector illumination differences will no longer be a problem.

As with FIG. 3, each integrator 430A, 430B, 430C directs a telecentric beam of light toward a projection system (not shown). The white light is then separated into its component red, green, and blue (RGB) bands of light (not shown). The RGB light may be separated by dichroic mirrors (not shown) and directed into separate red, green, and blue imagers within projection system for modulation. The modulated RGB light is then recombined by a prism assembly (not shown) and projected by a projection lens assembly (not shown) onto a display screen (not shown). Alternatively, the light from each integrator 430A, 430B, 430C may be separated into RGB bands of light in the time domain, for example, by a color wheel (not shown), and thus directed one-at-a-time into the projection system (not shown).

Although an exemplary projection system which incorporates the teachings of the present invention has been shown an described in detail herein, those skilled in the art can readily devise many other varied embodiments that still incorporate these teachings.

What is claimed is:

1. A projection display, comprising:
   an illumination source for producing light;
   a light-dividing prism for receiving light from the illumination source and dividing the received light based on polarization control; and
   a plurality of integrators, wherein the light received from the illumination source and divided by the light-dividing prism is provided to each of the plurality of integrators and wherein each of the plurality of integrators is a fiber integrator.

2. The projection display of claim 1 wherein each integrator is further coupled to one or more imaging devices.

3. The projection display of claim 1 wherein the light-dividing prism has one of a square shape and a rectangular shape.

4. A projection system having a projection display, comprising:
   an illumination source for producing light;
   a light-dividing prism for receiving light from the illumination source and dividing the received light based on polarization control; and
   a plurality of integrators, wherein the light received from the illumination source and divided by the light-dividing prism is provided to each of the plurality of integrators and wherein each of the plurality of integrators is a fiber integrator.

5. The projection system of claim 4 wherein each integrator is further coupled to one or more imaging devices.

6. The projection system of claim 4 wherein the light-dividing prism has one of a square shape and a rectangular shape.

* * * * *